United States Patent [19]

Elterman

[11] Patent Number: 4,804,269

[45] Date of Patent: Feb. 14, 1989

[54] ITERATIVE WAVEFRONT MEASURING DEVICE

[75] Inventor: Paul B. Elterman, Cambridge, Mass.

[73] Assignee: Litton Systems, Inc., Lexington, Mass.

[21] Appl. No.: 84,299

[22] Filed: Aug. 11, 1987

[51] Int. Cl.[4] ............................ G01J 1/20; G01B 9/02
[52] U.S. Cl. ...................................... 356/353; 250/201
[58] Field of Search ................. 250/201; 356/353, 354

[56] References Cited

U.S. PATENT DOCUMENTS

| | | | |
|---|---|---|---|
| 3,923,400 | 12/1975 | Hardy | 356/353 |
| 4,518,854 | 5/1985 | Hutchin | 250/201 |
| 4,692,027 | 9/1987 | MacGovern et al. | 356/353 |
| 4,696,573 | 9/1987 | Hutchin | 250/201 |
| 4,737,621 | 4/1988 | Gonsiorowski et al. | 250/201 |

Primary Examiner—David C. Nelms
Assistant Examiner—Michael Messinger
Attorney, Agent, or Firm—Michael H. Wallach; Robert F. Rotella

[57] ABSTRACT

A wavefront reconstruction and measuring system detects incoming light waves with a wavefront sensor having an array of photodetectors. The sensor provides a data processor with signals indicative of phase differences between sample points on the wavefront. The measured phase differences and respective spacing of the sample points form a matrix associated with the input wavefront. The matrix has unit cells with orthogonal sides defined by the measured phase differences and with corners defined by four commonly laterally, longitudinally or diagonally adjacent sample points. The data processor iteratively modifies each measured phase difference by a fraction of the curls of unit cells or groups of unit cells comprising the side defined by the measured phase difference. The data processor iteratively modifies each measured phase difference until the curls of each unit cell relaxes to ten percent or less of its original value. The iterative processing compensates for noise error in the initial wavefront measurements and enables parallel processing so as to reduce the amount of required memory space for reconstructing and measuring the wavefront.

34 Claims, 4 Drawing Sheets

ITERATIVE WAVEFRONT MEASURING DEVICE

BACKGROUND OF THE INVENTION

It is known that a light beam can be distorted as it passes through the atmosphere. In addition, other distortions are induced by the imperfections of receiving optical systems. Hence, adaptive optic systems have been devised to improve resolution of light waves by correcting these distortions.

Adaptive optic systems correct the distortions by measuring the shape of the wavefront distortion and reconstructing the wavefront. Adaptive optic systems generally accomplish this by sensing the wavefront with a wavefront sensor and thereafter, measuring the slope of the phase of detected light at several points along the wavefront by an array of light detectors. The resulting information is a matrix of measured phase differences between points on the wavefront. Phases of the various points forming the input wavefront are then calculated from the measured phase differences to reconstruct the wavefront.

For an ideal wavefront sensor, which measures phase differences with zero error, the wavefront phase can be calculated exactly by simply adding the phase differences between adjacent points. The relative phase between any two points, for such an ideal sensor, is independent of the path along which the phases are added. This is equivalent to stating that the vector curl of the phase differences (i.e. vector sum of the phase differences about a loop of points on the wavefront) is zero for a noiseless, ideal sensor.

In a real wavefront sensor there are always sources of error (noise), either due to the sensor, or due to the inherent quantum (photon) nature of light. In many practical applications the photon noise error is the primary limitation, and can be substantial. In such a system, the relative phases between two points depends on the path along which the phase differences are added. Thus, an accurate estimate of the wavefront can no longer be derived by simply adding the phase differences. The solution to this problem is to calculate a wavefront from the measured phase differences which is statistically optimum, or in other words, minimizes the effect of noise. This is equivalent to performing a least squares fit to the measured phase differences.

This least squares fit can be calculated exactly using standard numerical methods. The drawback to implementing an exact least squares fit is that the procedure is computationally intensive, and may require unacceptably large amounts of time or unacceptably complex and costly hardware. For example, a 10×10 element sensor array requires calculations involving a 100×100 element matrix. Likewise, a larger adaptive optic system utilizing a 100×100 element sensor array requires calculations involving a 10,000×10,000 element matrix, which is a time-consuming and costly process for even the largest of today's processors.

Accordingly, there has been an effort to develop systems which perform an approximate least squares wavefront fit to the measured phase differences. Many of these systems employ iterative schemes, as is the case for the invention presented herein. The criteria for judging these systems and their schemes are:

1. A low number of iterations required for acceptable convergence to the least squares solution.
2. A low number of arithmetic operations required per iteration.
3. Ease of implementation of the scheme.

Studies done to date indicate that the system presented herein meets all three criteria to an exceptional degree.

SUMMARY OF THE INVENTION

In the present invention an adaptive optic system employs a wavefront sensor and data processor which iteratively calculates phases of light at various points of an incoming wavefront. The wavefront sensor measures the slope of the phase of light at various points in a matrix across the wavefront. Each set of four commonly adjacent points (i.e. laterally, longitudinally or diagonally) defines a unit cell of the matrix. The data processor receives as input from the wavefront sensor the slope measurements and the distance between the associated spatial points of the matrix. The data processor determines measured phase differences between spatial points from the input slope measurements and distances between respective points. The measured phase difference between adjacent spatial points defines the magnitude of a vector between the spatial points. The data processor iteratively modifies each measured phase difference between spatial points of a unit cell by a fraction of the curl (i.e. the sum of the vectors about the unit cell) of the unit cell. The modification of each measured phase difference defines new resulting curls. The iterative modification continues until the resulting curls are sufficiently reduced as compared to respective original curls of the matrix. The data processor subsequently approximates phases of the light wave at the spatial points from the phase differences as finally iteratively modified.

In a preferred embodiment, the measured phase differences x[i,j] and y[i,j] in a two dimensional matrix are modified according to the equations:

$$\text{new } x[i,j] = x[i,j] + (\text{curl}[i-1,j]/R - \text{curl}[i,j]/R), \quad \text{Equation 1}$$

and $$\text{new } y[i,j] = y[i,j] + (\text{curl}[i,j]/R - \text{curl}[i,j-1]/R) \quad \text{Equation 2}$$

where $$\text{curl}[i,j] = x[i,j] - x[i+1,j] + y[i,j+1] - y[i,j], \quad \text{Equation 3}$$

wherein x and y are the x and y axes of the matrix, and i and j are the indexes of the spatial points forming the matrix, and R is a real number greater than one. In particular, R is preferably 4 or more. Further, the iterative modification is repeated until each resulting curl is reduced to ten percent or less of its respective original value, and preferably reduced to about one percent of its original value.

When the new set of phase differences satisfies the condition that the curl about each unit cell approximates zero, the phases of the light wave are found at all sample points i, j by summing the new phase differences along any arbitrary path of the matrix. All paths will yield nearly the same result, since the curls are nearly zero.

Further, other cells of the matrix instead of unit cells may be used in the above described iterative scheme. In particular, a fraction of the curl of a multi-cell containing several unit cells may be iteratively added to the measured phase differences of the matrix. R in that case is preferably the number of phase difference vectors summed about the circumference of the multi-cell.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

DESCRIPTION OF THE PREFERRED EMBODIMENTS

Figure 1:
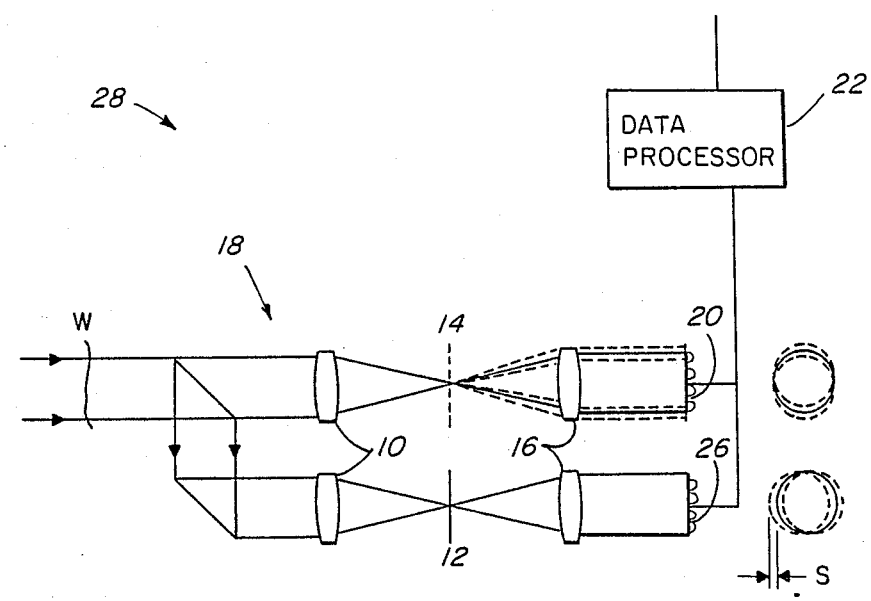
FIG. 1 is a schematic of an adaptive optic system embodying the present invention.

An adaptive optic system 28 embodying the present invention is provided in FIG. 1. An input signal wavefront W is sensed by an interferometer or Hartmann type wavefront sensor 18. By way of illustration and not limitation, FIG. 1 shows a shearing interferometer 18 which is preferably of the type developed by Hardy, et al. as described and herein incorporated by reference in "Real time Atmospheric Compensation", *J. Opt. Soc. Amer.* 67, 360, 1977. Shearing interferometer 18 splits input wavefront W into two sets of light beams for x and y axis processing. Lenses 10 focus the beams onto respective rotating transmissive gratings 12 and 14. The set of rotating gratings 12 and 14 provides a laterally displaced or sheared replica of each of the input wavefront light beams using the interference term between the zero (unsheared) and the ±1 (sheared) diffraction orders. The rotation of the gratings provides AC modulation of the interference fringes at each point in the pupil (i.e. view plane of the light beam). Each input wavefront beam is thus interfered with a laterally displaced, or sheared replica, of itself.

Lenses 16 collimate the diffracted beams which subsequently fall on x and y axis detector arrays 20 and 26 respectively. Each light detector in arrays 20 and 26 senses the intensity of a respective light beam at a coordinate point along the x or y axis of the detector. The coordinate points correspond to points in a grid pattern or matrix across the wavefront W. Each such sensed intensity provides a measurement of the slope, in a respective x or y direction, of the phase of light at the respective point along the wavefront. The displacement in the detector plane between the zero and first diffraction orders defines the shear distance S.

The resulting information provided by the shearing interferometer 18 is a set of current or voltage signals indicative of the slope in a respective x or y direction of the phase of light at points in the pupil plain separated by the shear distance S. These phase slopes are measured in two dimensions by the set of x and y detector arrays 20 and 26 respectively, so that the full pupil plane is sampled.

Figure 2:
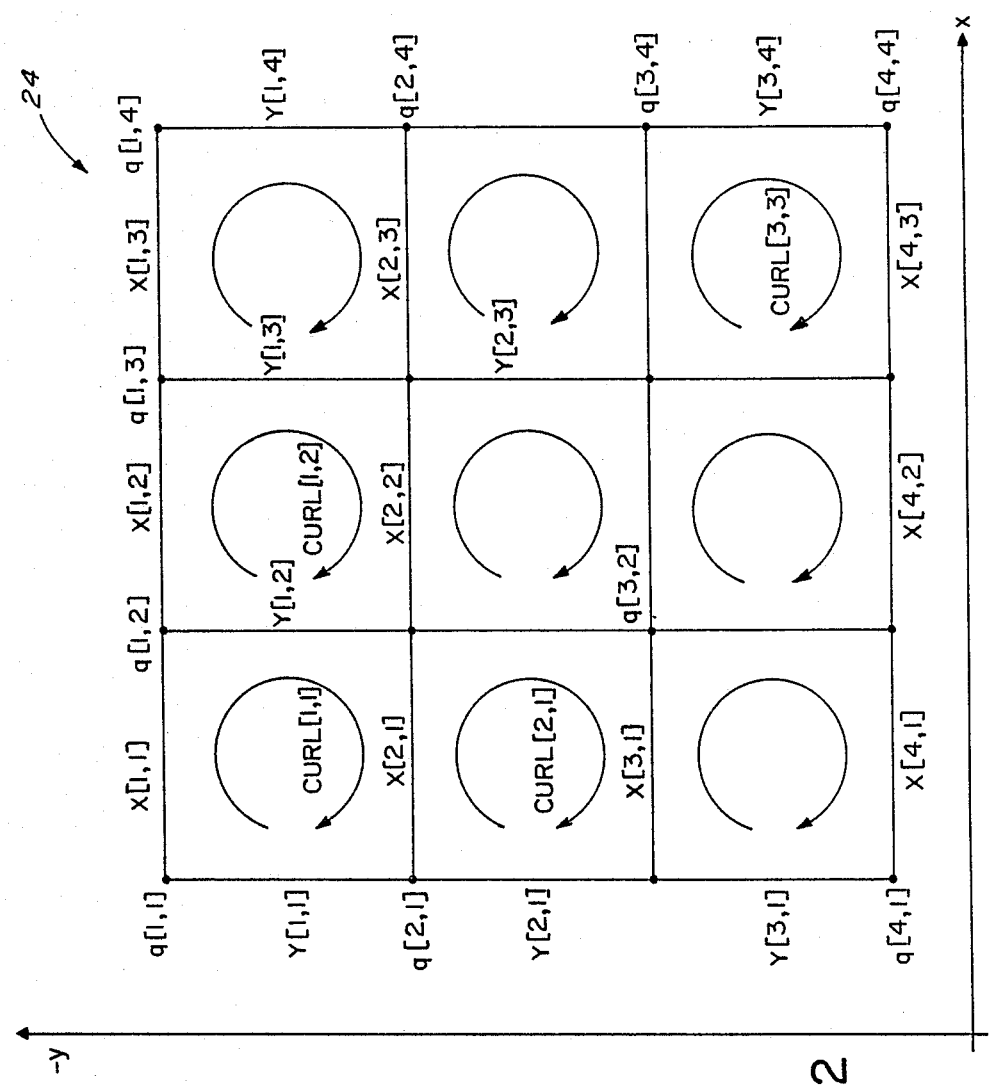
FIG. 2 is an illustration of a 4×4 matrix which is generated in the system of FIG. 1.

The phase slopes measured by the set of x and y detector arrays 20, 26 along with the defined distance between corresponding points of the matrix pattern across the wavefront are used to generate a grid pattern of electrical signals forming two-dimensional matrix 24 illustrated in FIG. 2. Other dimensional matrices are similarly possible and may be used. This matrix of signals is coupled to data processor 22 either in analog or digital form. Data processor 22 defines measured phase differences between adjacent points in the matrix from the product of the measured phase slopes and defined distances between respective adjacent points. Data Processor 22 then interprets matrix 24 as comprising nodes or points of intersections of horizontal and vertical vectors. The horizontal and vertical vectors represent the measured phase differences x, [i,j] and y[i,j], respectively as defined by processor 22, with the vector amplitude being the magnitude of the phase difference and the vector direction being orientation of the sign of the magnitude. The nodes represent the particular sample points on the wavefront, the phase U[i,j] of each which is to be calculated in order to reconstruct the wavefront for measurement. Further, each of four commonly and laterally, longitudinally or diagonally adjacent sample points forms what is referred to as a "unit cell" of the matrix. Each unit cell has sides defined by four vectors, each as described above, which respectively lie between the four sample points which define the unit cell.

Each node also has a constant value, q[i,j], defined by the sum of all phase differences converging at that node. This is mathematically stated as $$q[i,j] = x[i,j-1] - x[i,j] + y[i-1,j] - y[i,j].$$  Equation 4

Thus, using the signals and defined measurements of matrix 24, data processor 22 calculates the phase U[i,j] of the light wave at each sample point/node [i,j], as will be discussed, and thereby reconstructs the input wavefront. Data processor 22 may be any computer or electronic processor with memory as is known in the art.

It is well known that a least square solution to wavefront reconstruction is an exact solution. This solution states that the phase U[i,j] of each node/point of the wavefront is related to node charge q[i,j] by the following equation:

$$4U[i,j] - U[i-1,j] - U[i+1,j] - U[i,j-1] - U[i,j+1] = -q[i,j].$$  Equation 5

Equations 4 and 5 must be modified appropriately for corner and edge points. For example, Equation 5 becomes:

$$3U[1,j] - U[2,j] - U[1,j-1] - U[1,j+1] = q[1,j]$$

for a top row of points or nodes, and for the upper left hand corner point becomes:

$$2U[1,1] - U[1,2] - U[2,1] = q[1,1].$$

Also, in Equation 4, q[i,j] remains constant for each node.

In accordance with the invention, it has been found that a mathematically equivalent way of stating the least square solution, while accounting for noise in the phase slope and hence phase difference measurements, is to solve for a new set of phase differences which still satisfies Equation 4 but also satisfies the condition that the curl (i.e. the sum of the vectors) about each unit cell of the matrix is approximately zero. Once such a set of phase differences is found, light phase U[i,j] can be found for all sample points or nodes [i,j] by summing the phase differences along any arbitrary path. All paths will yield the same result, since the curls are zero.

The curl for each unit cell is defined by Equation 3 supra, i.e.

$$\text{curl}[i,j] = x[i,j] - x[i+1,j] + y[i,j+1] - y[i,j].$$

Data processor 22 calculates a new set of phase differences according to Equations 1 and 2 supra:

$$\text{new } x[i,j] = x[i,j] + (\text{curl}[i-1,j]/R - \text{curl}[i-j]/R),$$

and $$\text{new } y[i,j] = y[i,j] + (\text{curl}[i,j]/R - \text{curl}[i,j=1]/R).$$

These new phase difference values of x[i,j] and y[i,j] leave the node values of q[i,j] unchanged for each node within roundoff error. Equations 1 and 2 must be modified appropriately along the edges of the matrix 24 in which case only one curl/R is added or subtracted. Next, new values of x[i,j] and y[i,j] are substituted in Equation 3, and new curls are calculated. The process is iteratively continued until the curls relax (are reduced) to an acceptable small value, such as less than or equal to ten percent of their original value. Preferably, the calculation is continued until the curls are reduced to a about one percent of their original value.

Figure 3:
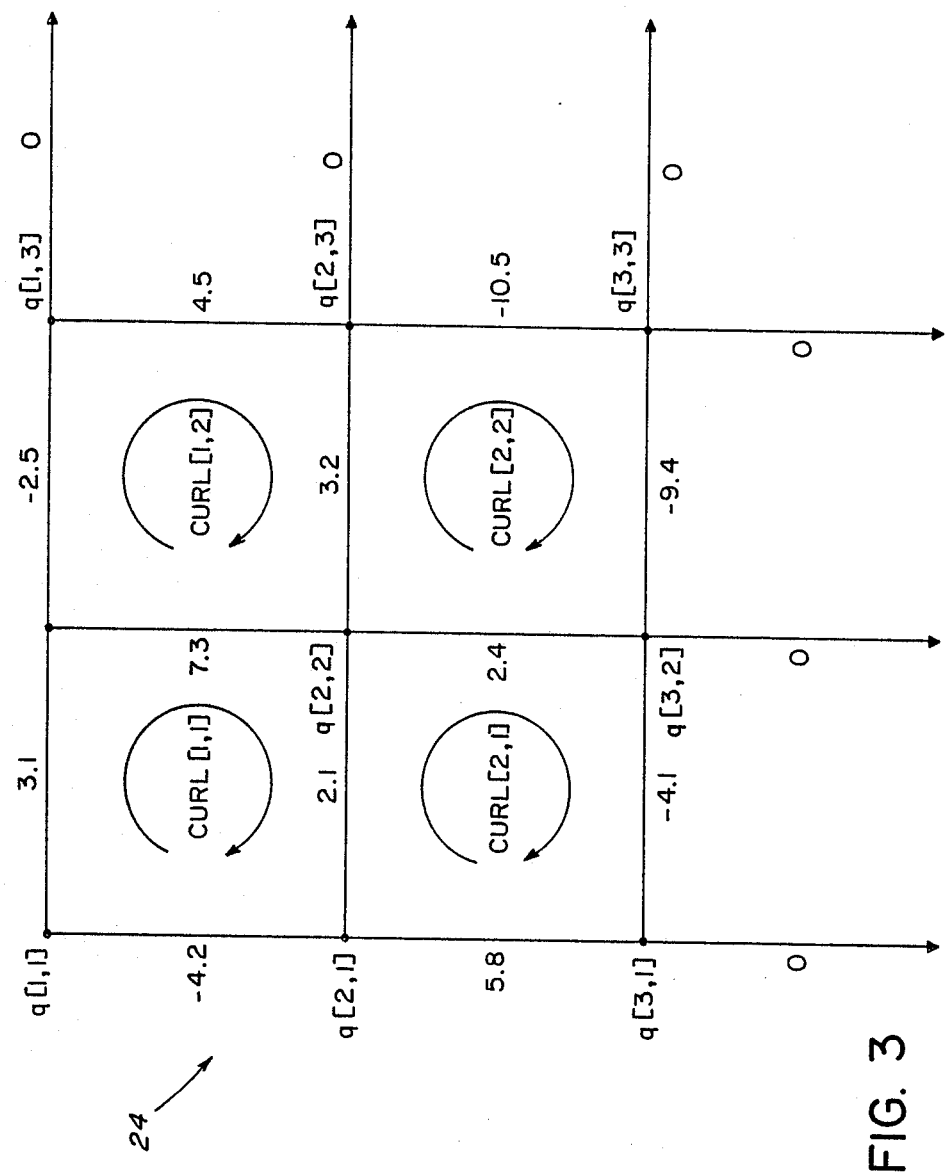
FIG. 3 is an illustration of an upper portion of the matrix of FIG. 2.
Figure 4:
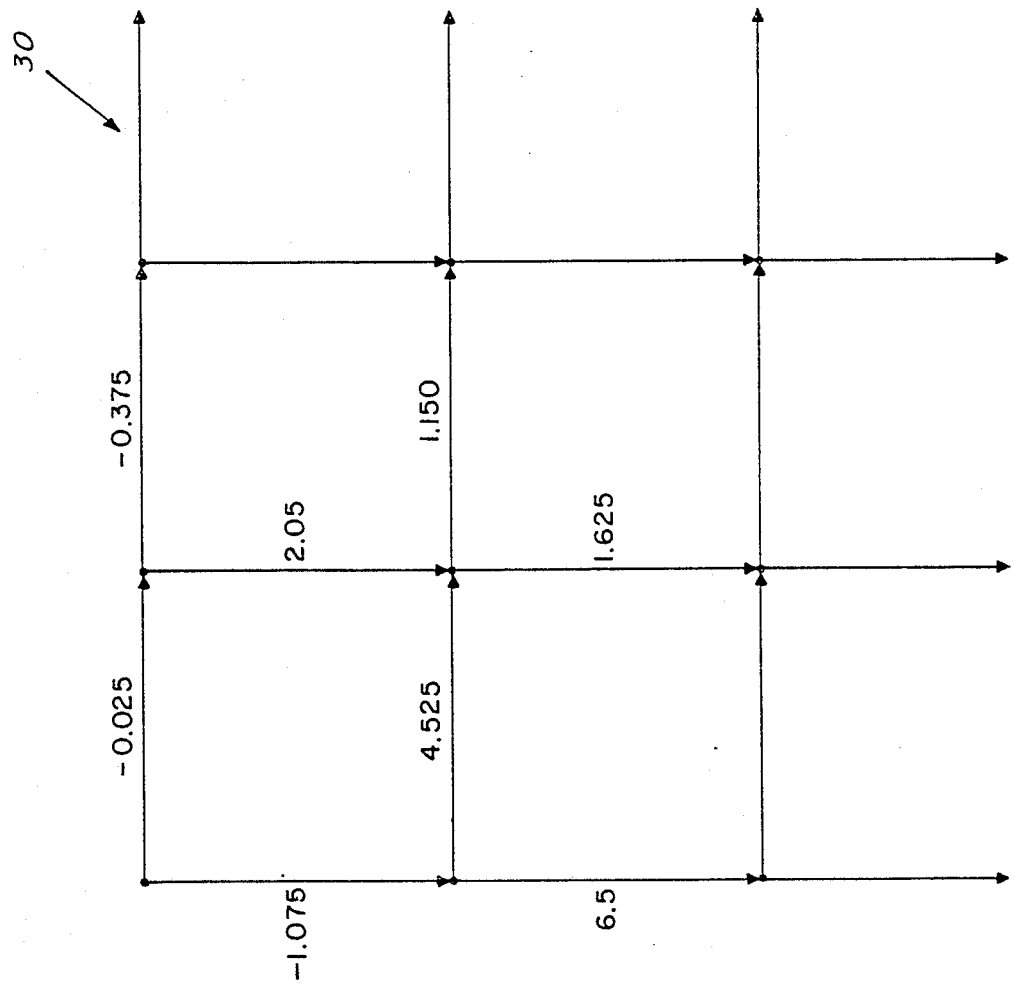
FIG. 4 is an illustration of the matrix of FIG. 3 after one iteration of the reconstruction algorithm of the present invention with R=4.

An illustration of this iterative process is schematically shown in FIGS. 3 and 4 with the use of the wavefront matrix 24 of FIG. 2. In this example, R=4, however, R may equal any real number greater than 1. Further, a different value of R may be used for phase differences along the edges of the matrix 24 than for the "internal" phase differences of matrix 24. For purposes of simplifying the example, the four unit cells of the upper left hand portion of the matrix 24 of FIG. 2 are provided separate from the whole matrix in FIG. 3. The illustrated phase differences in FIG. 3 have measured values of:

$$x[1,1] = 3.1$$

$$x[1,2] = 2.5$$

$$x[2,1] = 2.1$$

$$x[2,2] = 3.2$$

$$x[3,1] = -4.1$$

$$x[3,2] = -9.4$$

$$y[1,1] = -4.2$$

$$y[1,2] = 7.3$$

$$y[1,3] = 4.5$$

$$y[2,1] = 5.8$$

$$y[2,2] = 2.4$$

$$y[2,3] = -10.5$$

and all other x[i,j], y[i,j]'s equal zero. The sign of each value corresponds to the direction of the respective vector which represents the phase difference between two nodes.

According to Equation 4, the illustrated node charges q[i,j] have values $$q[1,1] = -3.1 - (4.2) = 1.1$$

$$q[1,2] = 3.1 - (-2.5) - 7.3 = -1.7$$

$$q[1,3] = -2.5 - 0 - 4.5 = -7$$

$$q[2,1] = -2.1 + (-4.2) - 5.8 = -12.1$$

$$q[2,2] = 2.1 - 3.2 + 7.3 - 2.4 = 3.8$$

$$q[2,3] = 3.2 - 0 + 4.5 - (-10.5) = 18.2$$

$$q[3,1] = -(-4.1) + 5.8 - 0 = 9.9$$

$$q[3,2] = -4.1 - (-9.4) + 2.4 - 0 = 7.7$$

$$q[3,3] = -9.4 - 0 + (-10.5) - 0 = -19.9$$

The curl[i,j] for each unit cell as defined by Equation 3 is as follows:

$$\text{curl}[1,1] = 3.1 - 2.1 + 7.3 - (-4.2) = 12.5$$

$$\text{curl}[1,2] = -2.5 - 3.2 + 4.5 - 7.3 = -8.5$$

$$\text{curl}[2,1] = 2.1 - (-4.1) + 2.4 - 5.8 = 2.8$$

$$\text{curl}[2,2] = 3.2 - (-9.4) + (-10.5) - 2.4 = -0.3$$

The first set of new phase differences are then defined by Equations 1 and 2 with R=4 and are as follows:

$$\text{new } x[1,1] = 3.1 + (-12.5/4) = -0.025$$

$$\text{new } x[1,2] = -2.5 + (-(-8.5)/4) = -0.375$$

$$\text{new } x[2,1] = 2.1 + (12.5/4 - 2.8/4) = 4.525$$

$$\text{new } x[2,2] = 3.2 + (-8.5/4 - (-0.3/4)) = 1.150$$

$$\text{new } y[1,1] = -4.2 + (12.5/4) = -1.075$$

$$\text{new } y[1,2] = 7.3 + (-8.5/4 - 12.5/4) = 2.05$$

$$\text{new } y[2,1] = 5.8 + (2.8/4) = 6.5$$

$$\text{new } y[2,2] = 2.4 + (-0.3/4 - 2.8/4) = 1.625$$

A matrix 30 of the new x[i,j] and new y[i,j] phase differences as calculated above is provided in FIG. 4. Note that node charges q[i,j] of the matrix 30 of FIG. 4 as defined by Equation 1 equal node charges q[i,j] of the matrix 24 of FIG. 3. Thus the condition of maintaining constant node charges q[i,j] has been satisfied.

A resulting curl[i,j] of the matrix 30 of FIG. 4 is $$\text{curl}_1[1,1] = -0.025 - 4.525 + 2.05 - (-1.075)$$
$$= -2.425.$$

where the sub-suffix of "1" indicates the curl after the first iteration of new x[i,j] and new y[i,j] values. It can be seen from this first iteration that original curl[i,j] has been substantially reduced. The value of $\text{curl}_1[1,1]$ is about twenty percent of the value of original curl[1,1] which is equal to 12.5. The values of the other resulting curls are similarly reduced. Thus, the calculation of new x[i,j] and new y[i,j] is preferably repeated n-times until resulting $\text{curl}_n[i,j]$, for all i,j, is preferably less than about ten percent of its original value.

Several test cases have shown that the root sum squares of the curls decrease by a factor of 2 for each iteration. The resulting curls [i,j] thus, preferably tend toward zero to satisfy our preferred condition for the inventive solution.

Although the data processing scheme is iterative, it lends itself to substantial parallel processing. Each curl in Equation 3 can be calculated in parallel, as can each new phase difference in Equations 1 and 2. Thus, the present invention may utilize parallel processing rather than successive memory. The reconstruction process, therefore, solves the problem of the excessive memory volume required in prior art devices.

Further, the modifying of each phase difference by a fraction of the curls of adjacent unit cells, has the effect of compensating for noise errors in the initial sensing and measuring of the phase differences. That is, a noiseless measurement of phase differences has a curl of zero. By distributing the effects of the noise (i,e. fractions of the adjacent curls), the present invention cancels the local effects of noise. The resulting curls tending toward zero provides an indication of such cancellation and of the driving toward a noiseless solution of the phase of light at points along the wavefront.

In addition, it is understood that the described iterative process may also be implemented utilizing cells other than the unit cell (i.e. a multi-cell comprising several unit cells) or utilizing a combination of unit cell and multi-cell calculations. For example, an array of $16 \times 16$ unit cells can be organized into an array of $8 \times 8$ larger-cells each containing a $2 \times 2$ array of unit cells. Curls can then be calculated for each of the larger cells by summing respective phase-difference vectors about the circumference of the larger cell. Corrections to each unit phase-difference vector forming the border of the larger cell are then made in a manner similar to that described in Equations 1, 2 and 3. R in this case may equal 8. The corrections are iteratively continued and a subsequent sum of the phase differences provides the solution phase measurements as in the method previously described.

The general form of the equations for the above described iterative process is:

$$\text{new } X[i,j] = X[i,j] + (\text{curl}[i-1,j]/R - \text{curl}[i,j]/R)$$

and $$\text{new } Y[i,j] = Y[i,j] + (\text{curl}[i,j]/R - \text{curl}[i,j-1]/R)$$

where X[i,j] and Y[i,j] define the sides of a rectangular cell having m and n adjacent points respectively and having respective x[r,s] and y[r,s] phase differences between the m and n points. The sides are thus defined by $$X[i,j] = \sum_{\substack{r = i(n-1) - (n-2) \\ s = j(m-1) - (m-2)}}^{\substack{s = j(m-1)}} x[r,s]$$

$$Y[i,j] = \sum_{\substack{r = i(n-1) - (n-2) \\ s = j(m-1) - (m-2)}}^{r = i(n-1)} y[r,s]$$

where
r and s are indexes of the phase difference points;
i and j are indexes of the sides of the cells;

$$\text{curl}[i,j] = X[i,j] - X[i+1,j] + Y[i,j+1] - Y[i,j];$$

and R is a real number greater than one.

While the invention has been particularly shown and described with reference to embodiments thereof, it will be understood by those skilled in the art that various changes in form and details may be made therein without departing from the spirit and scope of the invention as defined by the appended claims. For example, other wavefront sensors may be employed such as the Hartman-type sensor or Integrated Imaging Irradiance ($I^3$) Sensor as disclosed in U.S. Pat. No. 4,141,652.

I claim:

1. An optical wavefront measuring device comprising:
   a plurality of photodetectors positioned in a spatial array for sensing light waves of various phases, each photodetector generating a signal indicative of slope of the phase of the light wave at a respective point on the wave thereby forming a first matrix of phase slope signal points with a measurable distance between points;
   processor means responsive to the generated phase slope signals for
   (i) providing a second matrix of phase difference points by multiplying the phase slope at each point on the first matrix and the distance between respective points, each rectangular path of m adjacent phase difference points by n adjacent phase difference points defining a cell of the second matrix, each cell having sides defined by phase difference vectors between each of the m or n points along respective sides, each vector having a magnitude equal to the phase difference between respective points on the second matrix in which the vector lies;
   (ii) iteratively adding to each phase difference between two adjacent points on a cell path of the second matrix, a fraction of the vector sum of the phase difference vectors about the cell which is defined in part by the two points, for each cell defined in part by the two points, the adding producing a third matrix of points in which the vector sums are substantially reduced compared to the respective original vector sums of the second matrix,
   (iii) determining phase of the light wave at various points by summing the phase differences between respective points along any arbitrary path in the third matrix.

2. An optical wavefront measuring device as claimed in claim 1 wherein the processor means iteratively adds said fraction to each phase difference x[r,s] and y[r,s] along sides X[i,j] and Y[i,j] of the cells in the second matrix, the sides respctively having m and n adjacent phase difference points along respective x and y axes of the second matrix, the processor means iteratively adding according to the equations:

$$\text{new } X[i,j] = X[i,j] + (\text{curl } [i-1,j]/R - \text{curl}[i,j]/R),$$

and $$\text{new } Y[i,j] = Y[i,j] + (\text{curl}[i,j]/R - \text{curl}[i,j-1]/R)$$

where $$X[i,j] = \sum_{\substack{r = i(n-1) - (n-2) \\ s = j(m-1) - (m-2)}}^{s = j(m-1)} x[r,s]$$

$$Y[i,j] = \sum_{\substack{r = i(n-1) - (n-2) \\ s = j(m-1) - (m-2)}}^{r = i(n-1)} y[r,s]$$

and where
  r and s are indexes of the phase difference points in the second matrix;
  i and j are indexes of the sides of the defined cells in the second matrix;

$\text{curl}[i,j] = X[i,j] - X[i+1,j] + Y[i,j+1] - Y[i,j];$ and R is a real number greater than one.

3. An optical wavefront measuring device as claimed in claim 2 wherein R=8, m=3 and n=3.

4. An optical wavefront measuring device as claimed in claim 2 wherein R=4, m=2 and n=2.

5. An optical wavefront measuring device as claimed in claim 2 wherein R equals the number of phase difference vectors summed about a cell in the second matrix.

6. An optical wavefront measuring device as claimed in claim 2 wherein R=2[(m−1)+(n−1)].

7. An optical wavefront measuring device as claimed in claim 1 wherein the vector sums are reduced to about ten percent or less of the respective original vector sums of the second matrix.

8. An optical wavefront measuring device as claimed in claim 7 wherein each vector sum is reduced to about one percent of its original value.

9. A method of measuring a wavefront, the steps comprising:
  measuring phase differences between spatial points of the wavefront;
  forming a matrix of the spatial points, adjacent spatial points along rectangular paths defining cells of the matrix, the measured phase differences between immediately adjacent spatial points on the rectangular paths defining magnitudes of vectors between the respective points;
  iteratively adding to each measured phase difference between two immediately adjacent spatial points on the path of a cell, a fraction of each vector sum of the vectors about the cells having the two immediately adjacent spatial points in common with respective paths, the adding to each measured phase difference defining resulting vector sums of the vectors about the cells of the matrix, iteratively adding to each measured phase difference until the resulting vector sums are sufficiently reduced with respect to original vector sums; and
  calculating phase of light at each spatial point of the wavefront from the iteratively added-to measured phase differences as defined by the last iteration of said iterative adding.

10. A method as claimed in claim 9 wherein the step of iteratively adding to each measured phase differences includes adding to each measured phase difference x[r,s] and y[r,s] along sides X[i,j] and Y[i,j] of the cells, the sides respectively having m and n adjacent spatial points along an x and y axis of the matrix, the adding being accomplished according to the equations:

new $X[i,j] = X[i,j] + (\text{curl}[i-1,j]/R - \text{curl}[i,j]/R),$ and new $Y[i,j] = Y[i,j] + (\text{curl}[i,j]/R - \text{curl}[i,j-1]/R)$ where $$X[i,j] = \sum_{\substack{r = i(n-1) - (n-2) \\ s = j(m-1) - (m-2)}}^{s = j(m-1)} x[r,s]$$

$$Y[i,j] = \sum_{\substack{r = i(n-1) - (n-2) \\ s = j(m-1) - (m-2)}}^{r = i(n-1)} y[r,s]$$

and where
  r,s are indices of each spatial point;
  i,j are indices of the sides of the cells;

$\text{curl}[i,j] = X[i,j] - X[i+1,j] + Y[i,j+1] - Y[i,j];$ and R is a real number greater than one.

11. A method as claimed in claim 10 wherein R=4, m=2 and n=2.

12. A method as claimed in claim 10 wherein R=8, m=3 and n=3.

13. A method as claimed in claim 10 wherein R equals the number of vectors summed about a cell.

14. A method as claimed in claim 9 wherein the step of iteratively adding to each measured phase difference is repeated until the resulting vector sums are less that about 10 percent of respective original vector sums.

15. A method as claimed in claim 9 wherein the step of iteratively adding to each measured phase difference is repeated until the resulting vector sums are about one percent of respective original vector sums.

16. An optical wavefront sensing device comprising:
  an array of light detectors which provide signals indicative of measured phase differences between spatial points of a wavefront, the array of detectors arranged such that the spatial points form a matrix across the wavefront, each set of four commonly adjacent spatial points defining a unit cell of the matrix, each side of each unit cell having a value defined by the measured phase difference between the spatial points of the side; and
  a data processor responsive to the signals of the array of light detectors, the data processor iteratively modifying each measured phase difference between spatial points of a unit cell by a fraction of a curl of the unit cell, said modifying of the measured phase differences defining a resulting curl for each unit cell, the data processor iteratively modifying each measured phase difference until the resulting curls are substantially less than respective original curls and subsequently calculating the phase of light of the wavefront at each spatial point from the modified measured phase differences as defined by the last iteration.

17. An optical wavefront sensing device as claimed in claim 16 wherein the array of light detectors are arranged such that the spatial points form a two dimensional matrix having an x-axis and a y-axis, and the data processor modifies each measured phase difference x[i,j] and y[i,j] between spatial points i,j, according to the equations:

$$\text{new } x[i,j] = x[i,j] + (\text{curl}[i-1,j]/R - \text{curl}[i,j]/R)$$

and $$\text{new } y[i,j] = y[i,j] + (\text{curl}[i,j]/R - \text{curl}[i,j-1]/R)$$

where $$\text{curl}[i,j] = x[i,j] - x[i+1,j] + y[i,j+1] - y[i,j];$$

and R is a real number greater than one.

18. An optical wavefront sensing device as claimed in claim 17 wherein R=4.

19. An optical wavefront sensing device as claimed in claim 16 wherein each resulting curl is reduced to ten percent or less of its original value.

20. An optical wavefront sensing device as claimed in claim 16 wherein each resulting curl is reduced to about one percent of its original value.

21. An optical wavefront sensing device as claimed in claim 16 wherein the array of detectors is part of a wavefront sensor of the Hartman type.

22. An optical wavefront sensing device as claimed in claim 16 wherein the array of detectors is part of a wavefront sensor of the shearing interferometer type.

23. A method of measuring a wavefront the steps comprising:
   measuring phase differences spatial points of the wavefront;
   forming a matrix of the spatial points, for commonly adjacent spatial points defining a unit cell of the matrix, the measured phase differences between spatial points defining magnitudes of vectors between the points;
   iteratively adding to each measured phase difference between two immediately adjacent spatial points a fraction of each vector sum of the vectors about unit cells having the two immediately adjacent spatial points in common, the adding to each measured phase difference defining resulting vector sums of the vectors about the unit cells, iteratively adding to each measured phase difference until the resulting vector sums are sufficiently reduced with respect to original sums; and
   calculating phase of light at each spatial point of the wavefront from the iteratively added-to measured phase differences as defined by the last iteration of the said iterative adding.

24. A method as claimed in claim 23 wherein the step of iteratively adding to each measured phase difference includes adding to each measured phase difference x[i,j] and y[i,j], in a two dimensional matrix having an x and y axis, according to the equations:

$$\text{new } x[i,j] = x[i,j] + (\text{curl}[i-1,j]/R - \text{curl}[i,j]/R),$$

and $$\text{new } yi,j] = y[i,j] + (\text{curl}[i,j]/R - \text{curl}[i,j-1]/R)$$

where i,j are indices of each spatial point;

$$\text{curl}[i,j] = x[i,j] - x[i+1,j] + y[i,j+1] - y[i,j];$$

are R is a real number greater than one.

25. A method as claimed in claim 24 wherein R equals 4.

26. A method as claimed in claim 23 wherein the step of iteratively adding to each measured phase difference is repeated until the resulting vector sums are less than about ten percent of respective original sums.

27. A method as claimed in claim 33 wherein the step of iteratively adding to each measured phase difference is repeated until the resulting vector sums are about one percent of respective original sums.

28. An optical wavefront measuring device comprising:
   a plurality of photodetectors for sensing a wavefront of light, each photodetector generating a signal indicative of slope of a phase of light detected at a point, each photodetector detecting at a different point in a matrix, four commonly adjacent points defining a unit cell of the matrix;
   calculation means responsive to the detected slope signals for determining phase difference measurements between adjacent points of the matrix, and for iteratively adding, to each phase difference measurement between adjacent points which form a rectangular border of a group of adjacent unit cells, a fraction of a vector sum of vectors along the border of the group of adjacent unit cells, to produce a sufficiently reduced resulting vector sum of the vectors, each vector having a magnitude defined by a phase difference measurement between adjacent points of the matrix which the vector lies.

29. A wavefront measuring device as claimed in claim 28 wherein the calculation means iteratively adds to each phase difference measurement x[i,j] and y[i,j] along respective x and y axes of a matrix according to the equations:

$$\text{new } x[i,j] = x[i,j] + (\text{curl}[i-1,j]/R - \text{curl}[i,j]/R),$$

and $$\text{new } y[i,j] = y[i,j] + (\text{curl}[i,j]/R - \text{curl}[i,j-1]/R)$$

where
i,j are indexes of the points in the matrix;

$$\text{curl}[i,j] = x[i,j] - x[i+1,j] + y[i,j+1] - y[i,j];$$

and R is a real number greater than one.

30. A wavefront measuring device as claimed in claim 29 wherein R equals the number of vectors summed along the rectangular border of the group of adjacent unit cells.

31. A wavefront measuring device as claimed in claim 28 wherein each resulting vector sum of the vectors is reduced to ten percent or less of its respective original sum.

32. A wavefront measuring device as claimed in claim 28 wherein each resulting vector sum of the vectors is reduced to about one percent of its original sum.

33. A wavefront measuring device as claimed in claim 28 wherein the calculation means is a data processor.

34. A wavefront measuring device as claimed in claim 28 wherein the group of adjacent unit cells contains one or more unit cells.

* * * * *